United States Patent [19]

Vogelsang

[11] 4,432,442

[45] Feb. 21, 1984

[54] HYDRODYNAMIC TORQUE-TRANSFER UNIT, ESPECIALLY A HYDRODYNAMIC BRAKE

[75] Inventor: Klaus Vogelsang, Crailsheim, Fed. Rep. of Germany

[73] Assignee: Voith Turbo GmbH & Co KG, Fed. Rep. of Germany

[21] Appl. No.: 286,986

[22] Filed: Jul. 27, 1981

[30] Foreign Application Priority Data

Jul. 26, 1980 [DE] Fed. Rep. of Germany ....... 3028429

[51] Int. Cl.³ ...................... F16D 57/06; B60T 11/00; B60K 41/26; F01D 25/32
[52] U.S. Cl. .................................. 188/290; 188/352; 192/4 B; 415/169 R; 222/109; 60/455
[58] Field of Search ................... 188/290, 296, 264 E, 188/352; 192/4 B, 12 A; 303/10; 415/168, 169 A, 169 R; 60/455; 222/109, 36

[56] References Cited

U.S. PATENT DOCUMENTS

| 1,617,020 | 2/1927 | Merwin | 188/352 |
| 3,941,224 | 3/1976 | Hanke | 188/296 |
| 3,989,127 | 11/1976 | Staudenmaier et al. | 188/296 |
| 4,114,734 | 9/1978 | Bultmann | 188/296 |

FOREIGN PATENT DOCUMENTS 2405740 8/1975 Fed. Rep. of Germany.
1380847 1/1975 United Kingdom.

*Primary Examiner*—Bruce H. Stoner, Jr.
*Assistant Examiner*—Robert J. Oberleitner
*Attorney, Agent, or Firm*—Ostrolenk, Faber, Gerb & Soffen

[57] ABSTRACT

The disclosure concerns a hydrodynamic torque transfer unit, especially in the form of a hydrodynamic brake. The unit includes a working chamber with a stator and a rotor therein. The rotor is supported on a rotating shaft which has seals thereon outside the working chamber. Working fluid that leaks past the rotor shaft seals is collected in a leaked fluid reservoir. Both the fluid outlet from the leaked fluid reservoir and from the outlet line connected with the working chamber are delivered to a working fluid cooling reservoir. The working chamber is fed with working fluid from a separate feed reservoir. The cooling reservoir delivers recirculated working fluid to the feed reservoir. The feed reservoir is selectively pressurizable to force working fluid into the working chamber. A valve selectively pressurizes the feed reservoir and when it permits the feed reservoir to become depressurized, the valve communicates the pressure from the feed reservoir to the leaked fluid reservoir to drive fluid from the latter to the cooling reservoir. Other valves prevent transfer of working fluid from the cooling reservoir to the feed reservoir when the feed reservoir is pressurized and is delivering working fluid to the working chamber; and prevent transfer of working fluid from the feed reservoir when the feed chamber is not being pressurized and at this time permits working fluid to transfer from the cooling reservoir to the feed reservoir.

8 Claims, 1 Drawing Figure

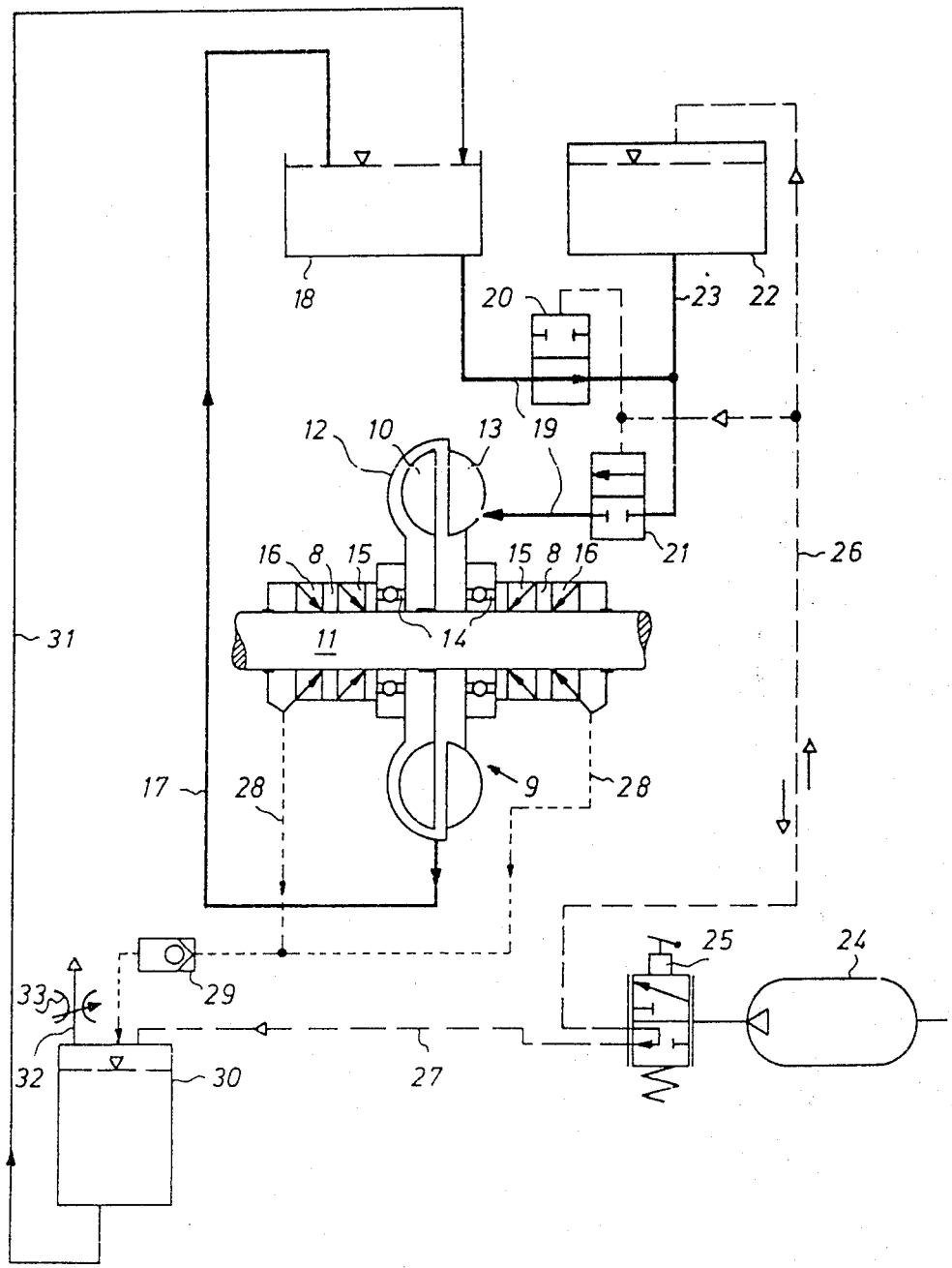

HYDRODYNAMIC TORQUE-TRANSFER UNIT, ESPECIALLY A HYDRODYNAMIC BRAKE

BACKGROUND OF THE INVENTION

The invention concerns a hydrodynamic torque-transfer unit, which is preferably in the form of a hydrodynamic brake. Such a brake is known from German Allowed Application (Auslegeschrift) No. 2 238 726, especially at FIG. 2. That brake is mounted in a housing surrounding a hollow space which is open to the environment so as to be subject to atmospheric pressure. Any fluid leaking out past the rotor shaft seals will first collect in this hollow space and then flow into a leakage reservoir mounted outside the housing. At the bottom of the housing, there is a feed reservoir that is more or less full of working fluid. The feed reservoir can be charged with compressed air. It is connected by a line to the external circulation system of the brake. There is another line from the leakage reservoir to the feed reservoir. The leakage reservoir can be charged, independent of the feed reservoir, with compressed air that will force the leaked fluid that has collected in the leakage reservoir through the line into the feed reservoir and hence back into the external circulation system of the brake.

As FIG. 1 of that German application shows, the leaked fluid that collects inside the housing will fall of its own weight into the feed reservoir when the feed reservoir is not being charged with compressed air. This presupposes that the feed reservoir is below the brake housing, which is not always the case.

The design illustrated in FIG. 2 of the German application will of course also be practical with the feed reservoir in another position, above the housing, for example. However, such an arrangement will necessitate additionalcontrols and more compressed air to return the leaked fluid to the feed reservoir.

SUMMARY OF THE INVENTION

The object of the present invention is to provide an improved hydrodynamic torque-transfer unit so that working fluid can be returned to the external circulation system, i.e. the working fluid recirculating means, of the brake automatically, at minimum cost, and, especially independently of the spatial relationship between the two reservoirs and between them and the line that connects with the external circulation system of the brake.

The present invention relates to a hydrodynamic torque-transfer unit, which is here in the form of a hydrodynamic brake. The brake conventionally includes a working fluid containing, toroidal shaped working chamber having a bladed stator and a cooperating bladed rotor contained within the working chamber, the rotor being rotatably supported on a rotor shaft. There is a working fluid inlet line to the working chamber. There is also a working fluid outlet line from the chamber. The adjustable volume of working fluid in the working chamber determines the amount of torque transferred, e.g. the braking force. There is an external, working fluid recirculation system which includes the outlet line from the working chamber, the inlet line to the working chamber and may also include a cooling reservoir through which the outleted working fluid passes for cooling before being returned to a feed reservoir that supplies the inlet line.

The rotor shaft extends through the walls of the working chamber and there are shaft sealing means at both ends of the shaft. Leakage of working fluid along the rotor shaft and past the sealing means is expected. The leaked working fluid is collected in a leaked fluid reservoir that is disposed beneath the rotor shaft so that the leaked fluid is moved to its reservoir by gravity. The leaked fluid reservoir communicates through the fluid recirculation system to the feed reservoir to the working chamber. The leaked fluid reservoir is preferably pressurized, which would force the leaked fluid into the recirculation system.

There is a working fluid feed reservoir which communicates into the inlet line to the working chamber. A pressure discharge line from the feed reservoir is connectable to the leaked fluid reservoir for pressurizing the same. A valve communicates with a pressure source for selectively pressurizing the feed reservoir, thereby to move working fluid to the working chamber. The same valve may also be used to selectively cut off the pressurization of the feed reservoir and to also open the line communicating between the feed reservoir and the leaked fluid reservoir for pressurizing the latter.

The fluid recirculation system includes a cooling reservoir that communicates through valve means with the feed reservoir for delivering the cooled, recirculated fluid back to the feed reservoir. Valve means are provided for directing working fluid to the feed reservoir from the cooling reservoir when the feed reservoir is not pressurized and for halting delivery of working fluid from the cooling reservoir when the feed reservoir is being pressurized. These valve means communicate with the line which pressurizes the feed reservoir for operating in conjunction with pressurization of the feed reservoir.

Pressurization of the feed reservoir may be accomplished using compressed air. For moving working fluid from the leaked fluid reservoir, the invention exploits the considerable pressure of the compressed air as it leaves the feed reservoir through a control valve, when the brake is released. When the air exhausted from the feed reservoir is pumped into the leaked fluid reservoir, this pressure is sufficient to lift the fluid to the top of the fluid recirculation system at the cooling reservoir. The invention demands only one additional fluid line from the control valve for selectively permitting pressurizing of the leaked fluid reservoir from the working fluid feed reservoir. The supplemental controls (as in FIG. 2 of German application No. 2 238 726) that have been necessary can be eliminated and less compressed air will be required as a result.

If the external circulation system, i.e. the recirculation system, has a cooling reservoir, which in most systems is at the top and is subject to atmospheric pressure, it is most practical to return the leaked fluid to this cooling reservoir.

BRIEF DESCRIPTION OF THE DRAWING

The drawing FIGURE is a schematic drawing of a hydrodynamic torque-transfer unit according to the invention.

DESCRIPTION OF THE PREFERRED EMBODIMENT

The brake 9 illustrated in the FIGURE comprises a rotor 10 a rotor shaft 11 and a brake housing 12 around the rotor. Also, within the housing is mounted a bladed stator 13. The rotor and stator in the housing define a toroidal shaped working chamber.

Rotor shaft 11 is mounted in housing 12 on two roller bearings 14. The ends of the shaft extend through the sides of the housing. Each end of the shaft is provided with two axially spaced shaft seals 15 and 16.

The toroidal working chamber between rotor 10 and stator 13 is connected through an outlet line 17 at the bottom of this chamber with an elevated operating fluid cooling reservoir 18 in the fluid recirculation system. An inlet line 19 from reservoir 18 leads to the working chamber through valve 20. Along inlet line 19 there are two relay valves 20 and 21. Between these two valves, inlet line 19 is connected over a line 23 to a pressure sealed feed reservoir 22 for working fluid.

There is a compressed-air reservoir or source 24 and a control valve 25, which may, for example, be manually controlled. The valve 25 has two conditions, wherein it connects a compressed-air line 26 from feed reservoir 22 to compressed-air reservoir 24 for pressurizing the feed reservoir or wherein it connects the pressurized feed reservoir to a discharge line 27, activating the brake 9 in the former case and releasing it in the latter.

Leaked fluid recovery lines 28 are connected axially outside of outer shaft seals 16 and lead either separately or, as shown in the FIGURE, after being united, through a check valve 29 into a leaked fluid reservoir 30, which is in the form of a pressurizable container. A line 31 leads from the bottom of leaked fluid reservoir 30 to the cooling reservoir 18. Discharge line 27 from control valve 25 and thus from line 26 empties into the top of leaked fluid reservoir 30. An outlet 32 provided with an adjustable throttle valve 33 and opening to the environment may also be mounted on the top of the leaked fluid reservoir 30.

The valves 20, 21 and 25 are shown in the "brake off" state, during which feed reservoir 22 is being supplied with working fluid through open valve 20 from the cooling reservoir 18. The working fluid supplied from reservoir 18 is recirculated from the working chamber outlet line 17 and the leaked fluid reservoir outlet line 31. When valve 25 is adjusted to admit compressed air into line 26, it will also reverse valves 20 and 21, causing valve 20 to interrupt the connection between cooling reservoir 18 and feed reservoir 22 and causing valve 21 to establish a connection between feed reservoir 22 and brake 9, supplying it with fluid.

When feed reservoir 22 is charged through line 26 with compressed air, this keeps the operating chamber of brake 9 fully supplied with working fluid. Any leaked fluid will accumulate in leaked fluid reservoir 30. Upon shifting of valve 25, the residual pressure of the exhaust air in feed reservoir 22 will force the leaked fluid out of leakage reservoir 30 over line 31 into cooling reservoir 18, and thus back into the external circulation system 17, 18 and 19.

Any fluid that accumulates in the spaces 8 between the inner and outer shaft seals 15 and 16 may be directly restored, over lines not shown, to cooling reservoir 18.

Hydrodynamic brakes of the type shown generally employ oil as a hydrodynamic fluid. The oil also lubricates roller bearings 14. This is why the roller bearings 14 are mounted axially inside shaft seals 15 and 16. This is not however a significant characteristic of the invention because other fluids, like water for example, to which antifreeze may be added if required, may also be employed. In the latter case, it will be necessary to seal off the rotor shaft from the working chamber so that the bearings can be lubricated with oil, grease, or the like.

The bearings and seals will then preferably be positioned in the following axially outwards sequence: frist shaft seal, second shaft seal (to the outside of which the above-mentioned leaked fluid recovery lines 28 will be connected), third shaft seal, bearing, and, finally, fourth shaft seal, with the third and fourth seal mounted, as is the common practice, to prevent the escape of bearing lubricant.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Hydrodynamic torque transfer apparatus, comprising:

a housing defining a working chamber for containing working fluid; a stator and a cooperating rotor in the housing for defining transfer means in the chamber, wherein the torque transferred is dependent upon the level of working fluid in the working chamber and the speed of rotation of the rotor with respect to the stator;

an inlet line for delivering working fluid to the working chamber; an outlet line for removing working fluid from the working chamber; fluid recirculating means for connecting the inlet and outlet lines to recirculate working fluid from the outlet line to the inlet line;

the rotor being supported on a shaft extending through the housing; sealing means sealing the shaft in the housing for reducing leakage of working fluid along the shaft;

a leaked fluid recovery line communicating with the rotor shaft outside the sealing means along the shaft for recovering working fluid that leaks past the sealing means; a leaked fluid reservoir connected to receive working fluid recovered by the recovery line; the leaked fluid reservoir communicating with the recirculating means for delivering working fluid thereto;

a working fluid feed reservoir connected to the inlet line for feeding working fluid to the working chamber;

pressurizing means selectively connectable to the feed reservoir for pressurizing the feed reservoir to urge working fluid into the inlet line to the working chamber;

first valve means for selectively connecting the pressurized fluid feed reservoir to the working chamber and for disconnecting them;

second valve means for selectively connecting the feed reservoir to the leaked fluid reservoir for pressurizing the leaked fluid reservoir with the pressure of the feed reservoir to urge working fluid from the leaked fluid reservoir to the recirculating means, and the second valve means being operable for disconnecting the feed reservoir and the leaked fluid reservoir;

means for coordinating the first and second valve means such that when the pressurizing means is connected to the feed reservoir, the feed reservoir is disconnected from the leaked fluid reservoir, and vice-versa.

2. The hydrodynamic torque transfer apparatus of claim 1, wherein the leaked fluid reservoir is disposed below the rotor shaft, whereby leaked fluid may move to the leaked fluid reservoir under the influence of gravity.

3. The hydrodynamic torque transfer apparatus of claim 1, wherein the recirculating means further comprises third valve means for blocking transmission of working fluid from the recirculating means to the feed reservoir, while the feed reservoir is pressurized by the pressurizing means.

4. The hydrodynamic torque transfer apparatus of claim 3, wherein said first valve means connects the pressurized fluid feed reservoir to the working chamber when said first valve means is in a first position and disconnects the pressurized fluid feed reservoir from the working chamber in a second position, and wherein said first valve means when in said second position, further blocks delivery of working fluid from the feed reservoir to the working chamber when the recirculating means is connected to the feed reservoir.

5. The hydrodynamic torque transfer apparatus of claim 4, wherein the first and third valve means are selectively connectable to the pressurizing means when the feed reservoir is connected with the pressurizing means, so that the pressurizing means causes the third valve means to disconnect the recirculating means from the feed reservoir and causes the first valve means to connect the feed reservoir to the working chamber; and when the first and third valve means are disconnected from the pressurizing means, this causes the third valve means to connect the recirculating means to the feed reservoir and causes the first valve means to disconnect the feed reservoir from the working chamber.

6. The hydrodynamic torque transfer apparatus of claim 5, wherein the second valve means also connects the first and third valve means to the pressurizing means.

7. The hydrodynamic torque transfer apparatus of any of claims 1, 3 or 5, wherein the recirculating means further comprises a cooling reservoir located between the feed reservoir on the one hand and both the outlet line and the leaked fluid reservoir on the other hand for storing working fluid from both the leaked fluid reservoir and the outlet line before delivery thereof to the feeding reservoir.

8. The hydrodynamic torque transfer apparatus of either of claims 1 or 3, wherein the leaked fluid reservoir has an outlet to the environment; a throttle valve for closing the leaked fluid reservoir outlet.

* * * * *